US005281982A

United States Patent [19]

Mosehauer et al.

[11] Patent Number: 5,281,982

[45] Date of Patent: Jan. 25, 1994

[54] PIXELIZED TONING

[75] Inventors: Michael Mosehauer; Mark C. Zaretsky, both of Rochester, N.Y.

[73] Assignee: Eastman Kodak Company, Rochester, N.Y.

[21] Appl. No.: 787,804

[22] Filed: Nov. 4, 1991

[51] Int. Cl.[5] .......... G01D 15/06

[52] U.S. Cl. .......... 346/159; 118/648

[58] Field of Search .......... 355/245, 259, 261, 262, 355/265; 118/648; 346/159, 155, 153.1

[56] References Cited

U.S. PATENT DOCUMENTS

| | | | |
|---|---|---|---|
| 4,491,855 | 1/1985 | Fujii et al. | 346/159 |
| 4,568,955 | 2/1986 | Hosoya et al. | 346/153.1 |
| 4,647,179 | 3/1987 | Schmidlin | 355/262 |
| 4,743,926 | 5/1988 | Schmidlin et al. | 346/159 |
| 4,755,837 | 7/1988 | Schmidlin et al. | 346/155 |
| 4,780,733 | 10/1991 | Schmidlin | 346/160.1 |
| 4,814,796 | 3/1989 | Schmidlin | 346/155 |
| 4,860,036 | 8/1989 | Schmidlin | 346/159 |
| 4,868,600 | 9/1989 | Hays et al. | 355/259 |
| 4,876,561 | 10/1989 | Schmidlin | 346/159 |
| 4,896,174 | 1/1990 | Stearns | 346/155 X |
| 4,903,049 | 2/1990 | Sotack | 346/159 |
| 4,903,050 | 2/1990 | Schmidlin | 346/160.1 |
| 4,912,489 | 3/1990 | Schmidlin | 346/159 |
| 4,949,103 | 8/1990 | Schmidlin et al. | 346/150 |
| 5,027,157 | 6/1991 | Hotomi et al. | 355/261 |
| 5,063,875 | 11/1991 | Folkins et al. | 118/651 |
| 5,136,311 | 8/1992 | Hays | 346/153.1 |
| 5,153,617 | 10/1992 | Salmon | 355/245 X |

FOREIGN PATENT DOCUMENTS 0155169 9/1985 European Pat. Off. .

2238985 6/1991 United Kingdom .

OTHER PUBLICATIONS

"Linear Motion of Dielectric Particles and Living Cells in Microfabicated Structures Induced By Travelling Electric Fields" by G. Fuhr, R. Hagedorn; T. Mueller; 1991 IEEE; pp. 259–264.

"Method For Single Pass High Quality Color Printing" by Michael D. Thompson; Xerox Discl. Bulletin; vol. 16 #2; Mar./Apr. 1991; p. 97.

"A New Nonlevitated Mode of Traveling Wave Toner Transport" by Fred W. Schmidlin from IEEE Transactions of Industry Applns.; vol. 27, #3, May/Jun. 1991; pp. 480–486 & 489.

*Primary Examiner*—A. T. Grimley
*Assistant Examiner*—Nestor R. Ramirez
*Attorney, Agent, or Firm*—Dennis R. Arndt

[57] ABSTRACT

Electrostatographic toning with charged toner particles which are transported along a conveyor having an array of repeating sets of electrodes upon which an electrostatic traveling wave pattern is established. The traveling wave pattern causes already charged toner particles to slide and roll along the conveyor to a selection site whereat individual toner particles are either directed toward the receiver or are returned to a developer reservoir. The width of each of the electrodes for the traveling wave grid is comparable to the size of the toner particles such that the particles are transported individually along the conveyor. At the selection site, unwanted particles are deflected from the path to a receiver. The receiver can be placed against a conveyor plate to avoid the divergence and bouncing problems.

14 Claims, 3 Drawing Sheets

PIXELIZED TONING

BACKGROUND OF THE INVENTION

1. Technical Field

This invention relates generally to electrostatographic copiers and printers.

2. Background Art

Most high speed copiers and printers use a dry electrostatographic process to place toner particles on paper. The process generally includes the creation of an electrostatic latent image which is developed with toner particles sized between two microns and eighteen microns. The developed image is transferred to a receiver sheet and fused.

In Direct Electrostatic Printing (DEP), charged toner particles are "gated" through holes in a pixel-wise fashion directly to a receiver from a charged toner conveyor. In one known format, the toner conveyor has an electrode array comprising repeating sets of electrodes upon which an electrostatic traveling wave pattern is established.

The traveling wave pattern causes already charged toner particles to travel along the conveyor to an area opposite a series of printhead apertures which form an electrode array of individually addressable electrodes which selectively propel toner therethrough to the recording media.

In Direct Electrostatic Printing which uses an electrode array as a toner conveyor, the width of each of the electrodes for the traveling wave grid is typically no smaller than about 100 microns separated by 100 micron spaces, and is used to transport 10 micron toner particles; an order of magnitude difference. This difference causes toner particles to be transported in mass, referred to in the literature as "clouds" of toner. Transporting toner in mass negatively effects control over individual particles.

Another disadvantage of Direct Electrostatic Printing, is that apertures must be used to select particles from the toner clouds for directing to the recording media. Such apertures are subject to clogging.

Yet another disadvantage of Direct Electrostatic Printing, is that the recording media must be substantially spaced from the aperture by a gap that allows divergence of the toner particles before they reach the recording media. The gap also permits the toner particles to bounce off the surface of the recording media.

DISCLOSURE OF INVENTION

In accordance with the present invention, charged toner particles are transported along a conveyor having an electrode array comprising repeating sets of electrodes upon which an electrostatic traveling wave pattern is established. The traveling wave pattern causes already charged toner particles to travel along the conveyor to a selection site whereat individual toner particles are either directed toward the receiver or are returned to a developer reservoir. The width of each of the electrodes for the traveling wave grid is comparable to the size of the toner particles such that the particles are transported individually along the conveyor so that superior control over individual particles can be maintained.

At the selection site, unwanted particles are deflected from the path to a receiver. This avoids the undesirable use of apertures to select particles from clouds of toner, as in the Direct Electrostatic Printing system. As mentioned above, apertures are subject to clogging.

According to another feature of the present invention, the receiver can be placed against a conveyor plate to avoid the divergence and bouncing problems of the Direct Electrostatic Printing system.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, not to scale, in which.

BEST MODE FOR CARRYING OUT THE INVENTION

Figure 1:
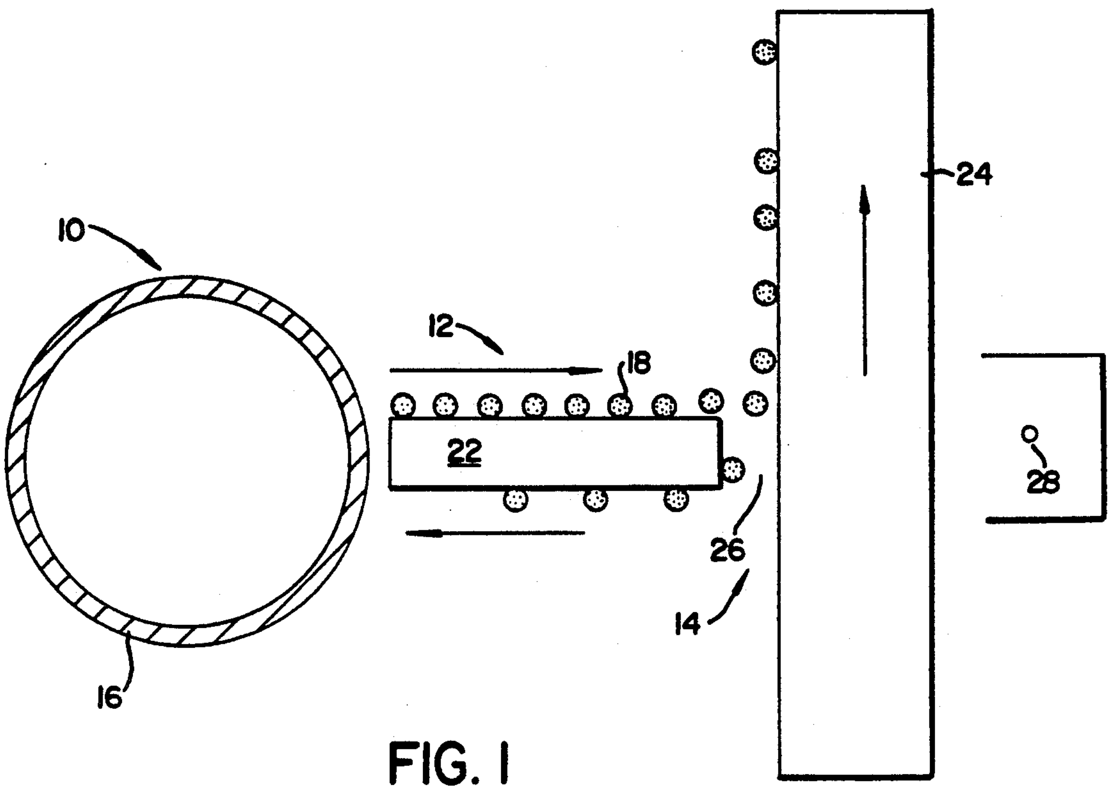
FIG. 1 is a schematic side elevational view of a pixelized toning apparatus according to a preferred embodiment of the present invention.

Referring to FIG. 1, an electrostatographic apparatus includes a toner particle delivery stage 10, a transport stage 12, and a selection stage 14. The delivery stage supplies toner particles, and preferably includes a magnetic brush 16; either of the two or single component variety. Other toner delivery systems are known, and the form selected is not critical to the operation of the present invention as long as a stream of charged toner particles 18 is provided by delivery stage 10 to transport stage 12.

Figure 2:
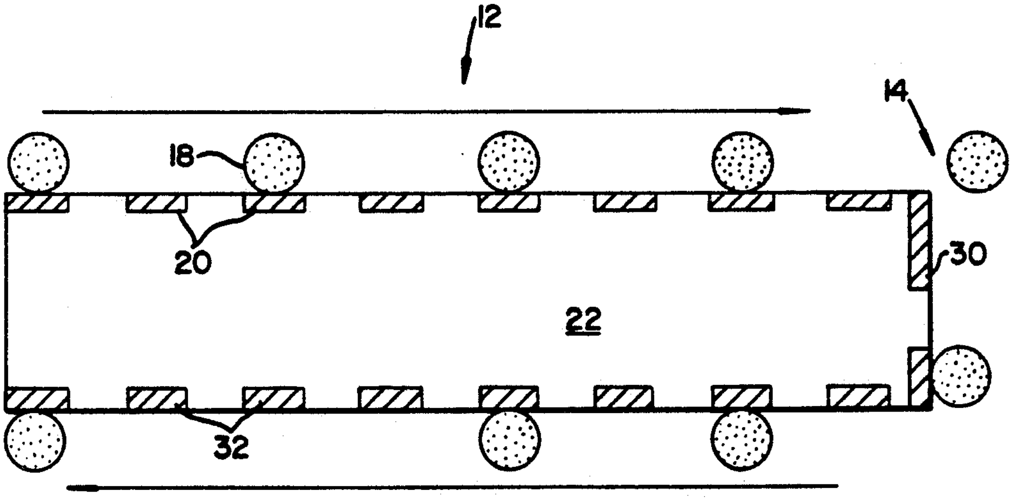
FIG. 2 is an enlarged elevational view of a portion of the pixelized toning apparatus shown in FIG. 1.
Figure 3:
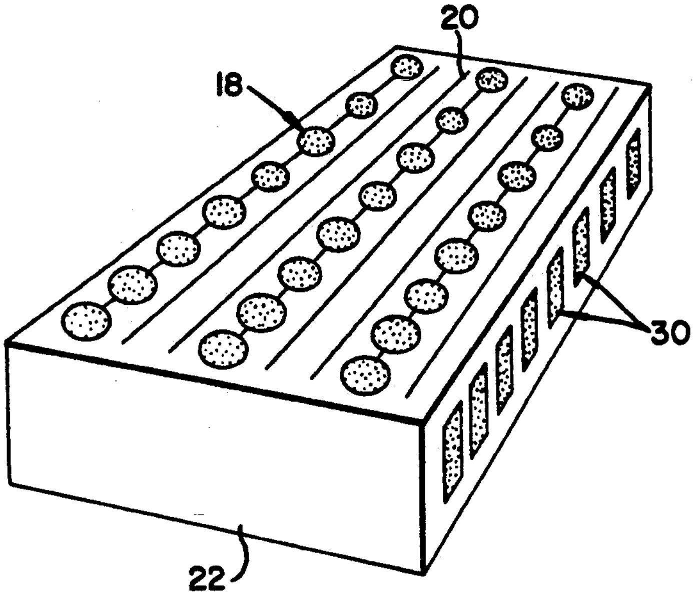
FIG. 3 is an enlarged perspective view of a portion of the pixelized toning apparatus shown in FIG. 1.
Figure 4:
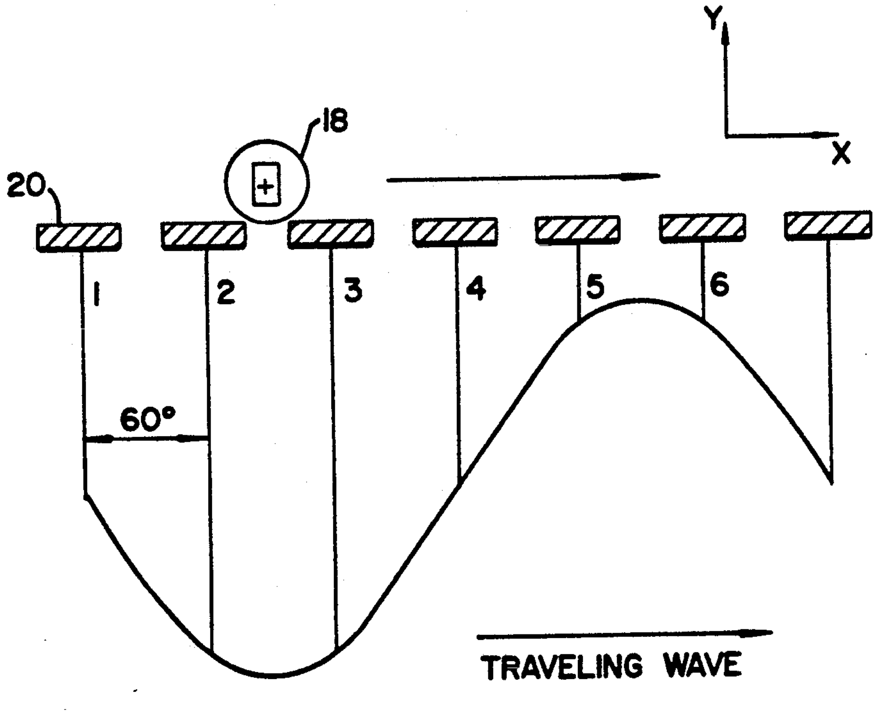
FIG. 4 is an illustration of the electrical excitation and resulting traveling wave electric field for a portion of the pixelized toning apparatus shown in FIG. 1.

Referring to FIGS. 2 and 3, transport stage 12 includes an inter-digitated array of transport electrodes 20 spaced apart along a surface of an electrically insulative support 22. In the illustrated embodiment, the electrodes are six-phase, such that every seventh electrode is connected. The skilled reader will understand that the traveling wave could be created using a different number of phases, and even a different wave form. Each electrode is driven by an AC voltage that is sixty degrees out of phase with its neighbors, resulting in an electrostatic traveling wave electric field that transports the charged toner particles in a synchronous manner across the support surface; as illustrated in FIG. 4.

The effect of the traveling wave electric field is to cause already charged toner particles delivered by magnetic brush 16 to travel along the surface of support 22 to selection stage 14 opposite a moving receiver 24. The receiver can be the recording member or an intermediate from which the toner image is subsequently transferred to a recording member.

The width of transport electrodes 20 and of the inter-electrode regions of the surface of support 22 are comparable to the diameter of the toner particles. As used herein, the term "comparable" means in a ratio whereby the particles are transported individually in cross-track, monolayer rows. The term "cross-track" refers to the direction parallel to the plane of the receiver and normal to the direction of receiver travel.

Although the present invention applies to toner particles and electrode dimensions of a broad size range, we believe that toner particles sized between approximately two and thirty microns will produce very satisfactory images.

When the relative size of transport electrodes 20, the inter-electrode regions of the surface of support 22, and the diameter of the toner particles is comparable, the toner particles are transported across the surface of the support in a translational motion, perhaps with some rotational motion (similar to a rolling motion); and any tendency for the toner particles to lift off the surface of the support is minimized. Lift off of the toner has been found to severely limit the maximum transport velocity.

Most of all, the relative sizes of transport electrodes 20, the inter-electrode spaces of the surface of support 22, and the diameter of the toner particles according to the present invention inhibit the formation of clouds of toner particles. Transport of monolayers of toner particles is encouraged to give more control over individual particles than would be attainable if the particles were in clouds.

It has been found that electrodes and inter-electrode spaces having an in-track width approximately equal to the diameter of the toner particles are suitable for transporting toner particles individually in cross-track, monolayer rows as described.

There is a relationship between toner liftoff, transport of clouds vs. monolayers of toner, the transport electrode and inter-electrode widths, and toner diameter. The transport array, together with its AC excitation, creates an electric field above the array whose amplitude can be represented using a Fourier series as follows:

$$E(x,y) \sim \Sigma_n \sin(2n\pi x/\lambda) e^{-(2n\pi/\lambda)y}$$

where x and y are indicated in FIG. 4 and λ is the spatial wavelength of the array. For a six-phase structure with equal width electrode and inter-electrode regions, λ is twelve times the electrode width. It can be seen that the exponential decay length of the electric field normal to the transport plane is $\lambda/2n\pi$ (or $\lambda/2\pi$ for the fundamental spatial frequency). If the toner diameter is much smaller than an electrode width, then the electric field experienced by a toner particle is roughly constant throughout the particle. This results in the formation of clouds of toner that experience a significant normal, as well as tangential, force. However, if the toner diameter is comparable to the electrode width, then the electric field decays significantly throughout the particle. This results in the formation of monolayers of toner that experience a minimal normal force.

Selection stage 14 is located at the right experience a minimal normal force.

Selection stage 14 is located at the right (as illustrated) end of transport stage 12. Toner particles which are to be transferred to the receiver are drawn across a gap 26 by an electric field established by the counter charge supplied by a transfer electrode 28. The remaining toner particles are selectively withdrawn through gap 26 from the flow to the receiver by a series of selection electrodes 30, and returned to delivery stage 10 by return electrodes 32.

Figure 5:
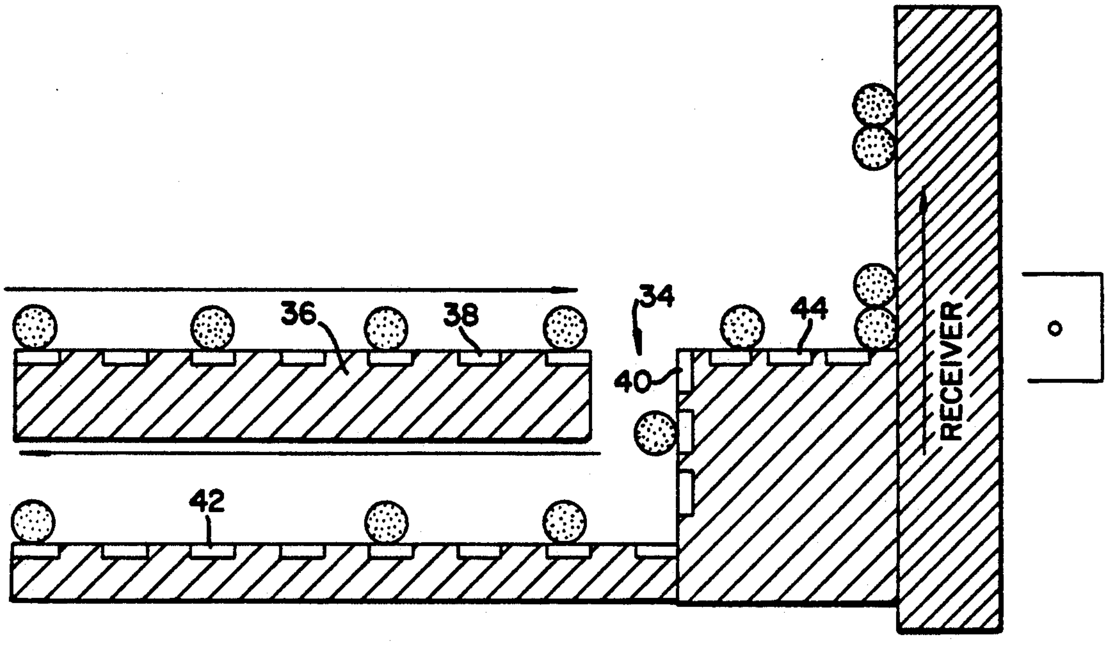
FIG. 5 is a schematic side elevational view of a pixelized toning apparatus according to a second preferred embodiment of the present invention.

It is possible that some receivers will have such rough or cockled surfaces, and that this might result in a variably sized gap between the end of support 22 and the receiver; resulting in turn in inefficient or inconsistent transfer of toner particles to the receiver. In FIG. 5, a second preferred embodiment of the present invention is illustrated wherein the selection process occurs at a gap 34 spaced along the surface of support 36 from the point of transfer of toner to the receiver. Toner particles are moved along the surface of support 36 by primary transport electrodes 38 until they reach gap 34. Selection electrodes 40 withdraw unwanted toner particles from the flow to the receiver, to be returned to the delivery stage by return electrodes 42. Toner particles which are to be transferred to the receiver are drawn across gap 34, and continue to the receiver by secondary transport electrodes 44. The receiver abuts the support.

Figure 6:
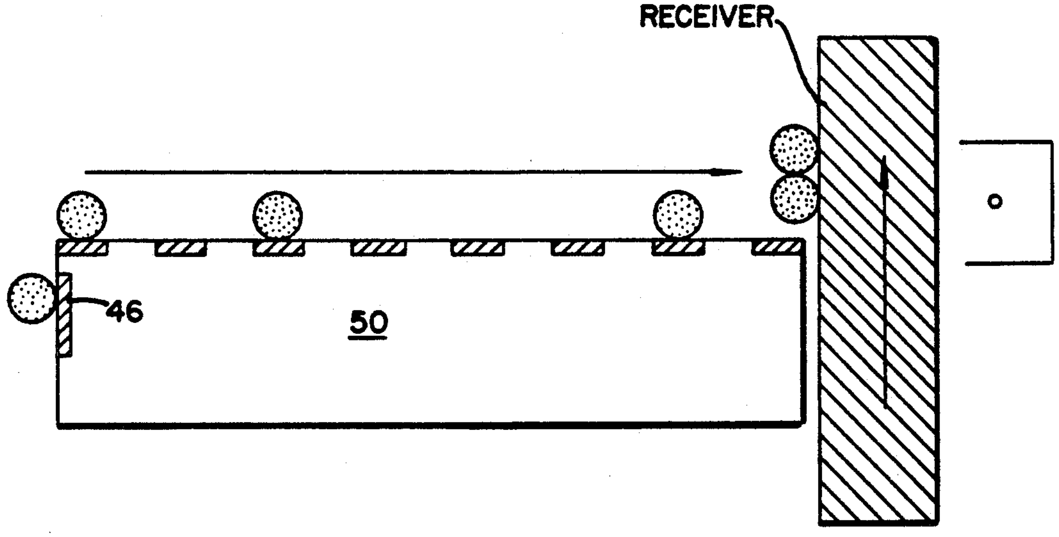
FIG. 6 is a schematic side elevational view of a pixelized toning apparatus according to a third preferred embodiment of the present invention.

In a third preferred embodiment of the present invention, shown in FIG. 6, the selection process occurs at electrodes 46 between the toner delivery stage (not shown) and support 50 for providing both a fixed location for the selection process (as in the embodiment of FIG. 5) and immediate recycling of unselected toner, which actually remains at the delivery stage. Because the unselected toner remains at the delivery stage, a plurality of different delivery stages with different-color toners can be immediately switched into position without having to wait for unselected toner particles to return to the last delivery stage before a new one can be brought into alignment with the transport stage.

The invention has been described in detail with particular reference to preferred embodiments thereof, but it will be understood that variations and modifications can be effected within the spirit and scope of the invention.

What is claimed is:

1. Apparatus for transporting toner particles of predetermined particle size from a supply of electrically charged toner particles to a receiver positioned remote from said supply, said apparatus comprising:

a support surface extending in an in-track toner transport direction between the toner particle supply and the receiver position;

an array of spaced apart electrodes along said surface, each of said electrodes being elongated in a cross-track direction that is transverse to the toner transport direction, said electrodes having an in-track width substantially equal to the toner particle size; and means operatively connected to said electrodes for impressing sinusoidal voltages of different phases to said electrodes so that the phase of an electrode is shifted with respect to adjacent electrodes to create a traveling wave electrostatic field that transports the charged toner particles in a synchronous manner that causes the particles to slide and roll along the surface of the support without jumping and remain in contact with the support as they move in the in-track toner transport direction.

2. Apparatus for transporting toner particles as defined in claim 1 wherein the in-track dimension of the spaces between said spaced apart electrodes is comparable to the toner particle size being used.

3. Apparatus for transporting toner particles as defined in claim 1 further comprising a selection stage including:

a gap;

means for establishing an electric field to draw toner particles which are to be transferred to the receiver position across the gap; and means for selectively deflecting unwanted particles through the gap and back to the toner particle supply.

4. Apparatus for transporting toner particles as defined in claim 3 wherein said deflecting means comprises a series of selection electrodes aligned in the cross-track direction and adapted, when actuated, to deflect toner particles through said gap.

5. Apparatus for transporting toner particles as defined in claim 3 wherein said gap is located at the end of the support-defined surface adjacent to the receiver position, whereby toner particles leaving the surface are drawn across the gap or deflected therethrough.

6. Apparatus for transporting toner particles as defined in claim 3 wherein said gap is located at the end of the support-defined surface adjacent to the supply of toner particles, whereby toner particles leaving the supply are drawn across the gap or deflected therethrough.

7. Apparatus for transporting toner particles as defined in claim 3 wherein said gap is located intermediate the ends of the support-defined surface adjacent to the supply of toner particles, whereby toner particles leaving the supply are drawn across the gap and continue along the surface to the receiver position or deflected therethrough.

8. Apparatus for transporting toner particles as defined in claim 1 wherein said toner particle size is between approximately two and thirty microns.

9. Apparatus for transporting toner particles as defined in claim 8 wherein said electrode dimension is between approximately two and thirty microns.

10. Apparatus for transporting toner particles of predetermined particle size from a supply of electrically charged toner particles to a receiver positioned remote from said supply, said apparatus comprising:

a support surface extending in an in-track toner transport direction between the toner particle supply and the receiver position;

an array of spaced-apart electrodes along said surface, each of said electrodes being elongated in a cross-track direction transverse to the toner transport direction, said electrodes having an in-track width substantially equal to the toner particle size; and means operatively connected to said electrodes for impressing sinusoidal voltages of different phases to said electrodes so that the phase of an electrode is shifted with respect to adjacent electrodes to create a traveling wave electrostatic field that decays through the toner particles to transport a single layer of charged toner particles in a synchronous manner along the surface of the support that causes the particles to slide and roll along the surface of the support without jumping as they move in the in-track toner transport direction.

11. Apparatus for transporting toner particles as set forth in claim 10 wherein the number of phases is equal to P where $P \geqq 3$.

12. Apparatus for transporting toner particles as set forth in claim 11 wherein the length of a period of the traveling wave is represented by $\lambda$ where $\lambda$ is equal to 2Pw, with w being equal to the width of an electrode.

13. Apparatus for transporting toner particles as set forth in claim 10 wherein said electrostatic field above the surface of the support has an amplitude represented by the following Fourier series:

$$E(x,y) \sim \sum_n \sin(2n\pi x/\lambda)e^{-\left(\frac{2n\pi}{\lambda}\right)y}$$

where x is in the direction of particle movement, y is normal to the direction of particle movement and $\lambda$ represents twelve times the width of an electrode.

14. Apparatus for transporting toner particles as set forth in claim 13 wherein said electrostatic field has an exponential decay length of the electric field normal to the toner transport surface is equal to $\lambda/2\pi$ for the fundamental spatial frequency.

* * * * *